United States Patent
Matsushita

(10) Patent No.: US 8,639,972 B2
(45) Date of Patent: Jan. 28, 2014

(54) IMAGE PROCESSING SYSTEM AND BACKUP METHOD FOR IMAGE PROCESSING APPARATUS

(75) Inventor: Mitsugu Matsushita, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1047 days.

(21) Appl. No.: 12/320,917

(22) Filed: Feb. 9, 2009

(65) Prior Publication Data
US 2009/0231612 A1  Sep. 17, 2009

(30) Foreign Application Priority Data
Mar. 14, 2008  (JP) ................................ 2008-066837

(51) Int. Cl.
*G06F 11/00* (2006.01)

(52) U.S. Cl.
USPC ................. 714/13; 714/6.3; 714/2; 714/10

(58) Field of Classification Search
USPC .................... 714/2, 13, 25, 6.3, 6.1
See application file for complete search history.

(56) References Cited

U.S. PATENT DOCUMENTS

| | | | |
|---|---|---|---|
| 2003/0028592 A1* | 2/2003 | Ooho et al. | 709/203 |
| 2004/0054700 A1* | 3/2004 | Okada | 707/204 |
| 2004/0107379 A1* | 6/2004 | Rust et al. | 714/1 |
| 2005/0021573 A1* | 1/2005 | McDermott et al. | 707/204 |
| 2006/0184828 A1* | 8/2006 | Wynn et al. | 714/38 |
| 2007/0076256 A1 | 4/2007 | Yamamoto et al. | |
| 2007/0086022 A1 | 4/2007 | Kumagai | |
| 2007/0174692 A1* | 7/2007 | Nagasawa | 714/13 |
| 2007/0220367 A1* | 9/2007 | Smith et al. | 714/48 |
| 2007/0226538 A1* | 9/2007 | Ban et al. | 714/13 |

FOREIGN PATENT DOCUMENTS

| | | |
|---|---|---|
| CN | 1933527 | 3/2007 |
| JP | 2002-283683 | 10/2002 |
| JP | 3527055 | 2/2004 |
| JP | 2004-094617 | 3/2004 |
| JP | 2005-234884 | 9/2005 |
| JP | 2007-034451 | 2/2007 |
| JP | 2007-193400 | 8/2007 |

OTHER PUBLICATIONS

Office Action dated Oct. 8, 2010 issued in corresponding Chinese Application No. 200910128163.7 and English translation thereof.
Abstract of JP 10-269045 published on Oct. 9, 1998.
Office Action dated Feb. 28, 2012 issued in corresponding Japanese Application No. 2008-66837.

* cited by examiner

Primary Examiner — Sarai Butler
(74) Attorney, Agent, or Firm — Harness, Dickey & Pierce, P.L.C.

(57) ABSTRACT

Each of a plurality of image processing apparatuses includes a module storing unit that stores therein a registered function module and a backup unit that backs up the stored function module and restores a function module based on backup data of the function module. An external storage device stores therein the backup data of the function module. When an error occurs in a first image processing apparatus, the backup unit of a second image processing apparatus restores the function module corresponding to the first image processing apparatus based on the backup data of the function module stored in the external storage device.

11 Claims, 11 Drawing Sheets

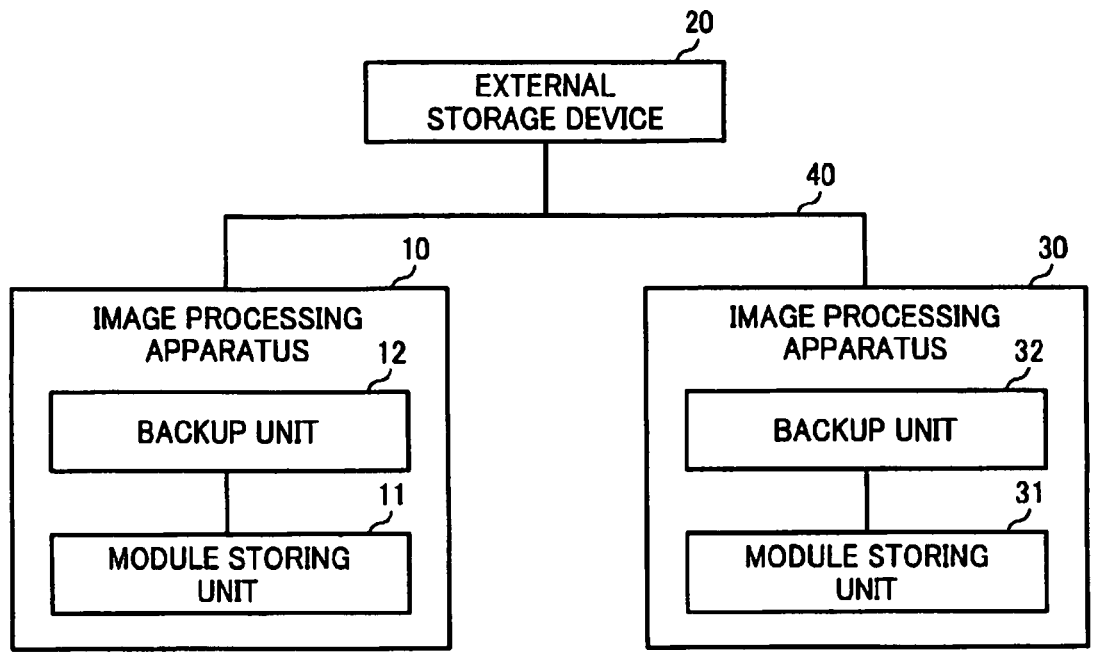

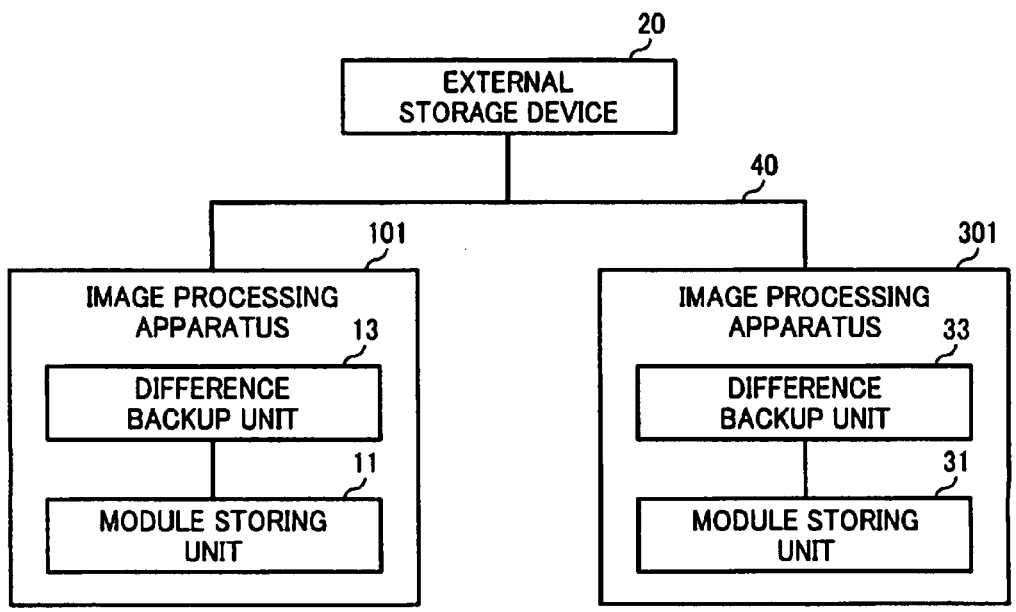
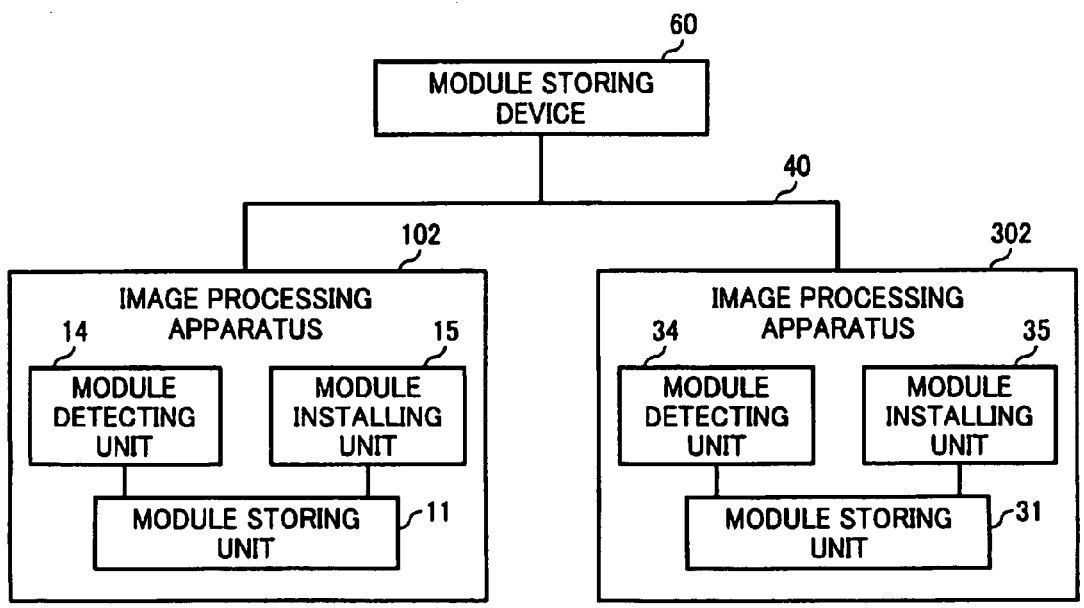

| FUNCTION MODULE ID | FUNCTION MODULE FILE |
|---|---|
| 12345678 | 12345678.jar |
| 12345679 | 12345679.jar |
| 12345680 | 12345680.jar |
| ⋮ | ⋮ |

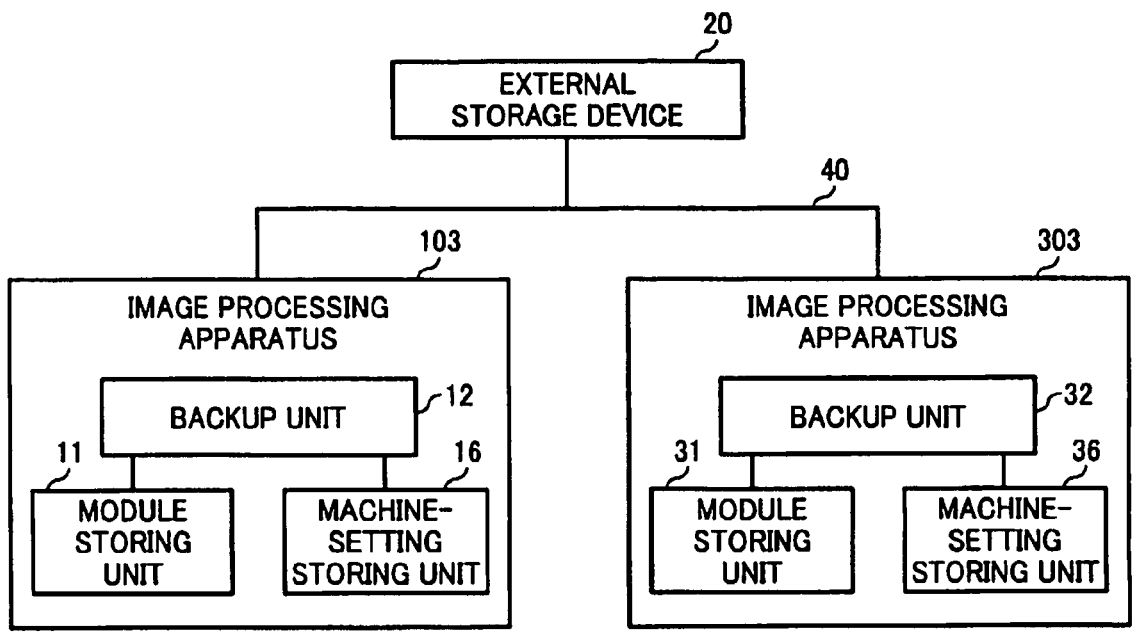

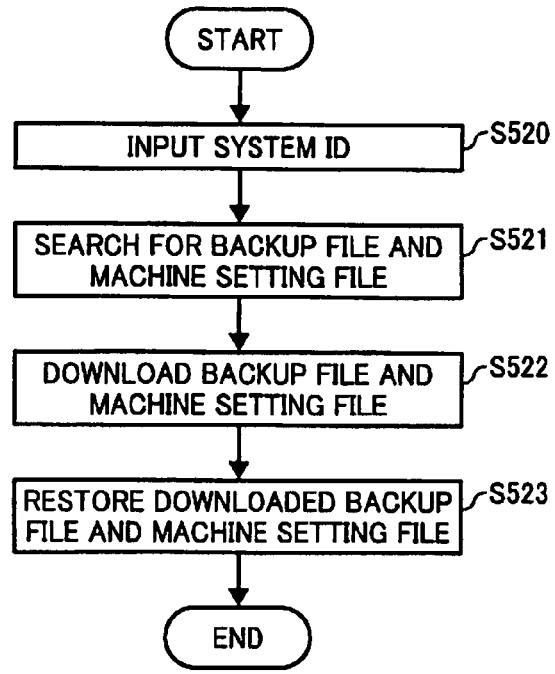
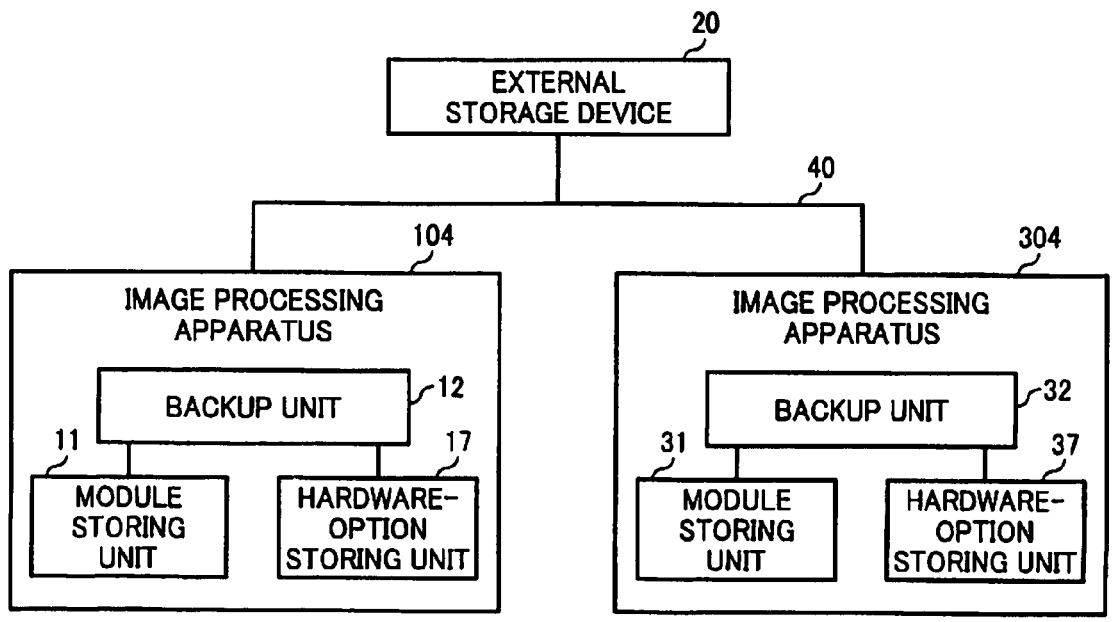

| SYSTEM ID | BACKUP FILE | HARDWARE-OPTION SETTING FILE |
|---|---|---|
| 00000001 | 00000001.bak | 00000001.opt |
| 00000002 | 00000002.bak | 00000002.opt |
| 00000003 | 00000003.bak | 00000003.opt |
| ⋮ | ⋮ | |

| LOG FILE |
|---|
| 2007/08/28 10:00:00  12345678.jar  INSTALLED |
| 2007/08/28 12:00:00  12345679.jar  INSTALLED |
| 2007/08/29 10:00:00  12345680.jar  INSTALLED |
| ⋮              ⋮ |

| SYSTEM ID | BACKUP FILE | HISTORY FILE |
|---|---|---|
| 00000001 | 00000001.bak | 00000001.log |
| 00000002 | 00000002.bak | 00000002.log |
| 00000003 | 00000003.bak | 00000003.log |
| ⋮ | ⋮ | |

IMAGE PROCESSING SYSTEM AND BACKUP METHOD FOR IMAGE PROCESSING APPARATUS

CROSS-REFERENCE TO RELATED APPLICATIONS

The present application claims priority to and incorporates by reference the entire contents of Japanese priority document 2008-066837 filed in Japan on Mar. 14, 2008.

BACKGROUND OF THE INVENTION

1. Field of the Invention

The present invention relates to a technology for creating a backup of processing environments of an image processing apparatus equipped with a plug-in mechanism to install and uninstall a function module.

2. Description of the Related Art

A typical example of an image processing apparatus includes a copier that scans an original to obtain digital image data and prints the image data on a recording medium, and a multifunction product (MFP) that has functions of copying, facsimileing, printing, and telecommunication. Such an image processing apparatus having multiple functions can be connected another image processing apparatus, a server, or a computer via a communication line such as an offline or a network, to build an image processing system. In such an image processing system, an image input-output job can be shared among the image processing apparatuses by communicating image data or control data.

Particularly, in recent years, because of the advent of image processing apparatuses that have multiple functions, each image processing apparatus in an image processing system is equipped with a plug-in mechanism for installing and uninstalling various function modules (see, for example, Japanese Patent No. 3527055).

Such plug-in mechanism for installation or uninstallation of function modules allows optimization of image processing apparatuses in an image processing system according to the user requirements. That is, each image processing apparatus in an image processing system can be customized to perform specific functions according to the user requirement. However, in that case, if an error occurs in one of the image processing apparatuses in an image processing system, then it becomes difficult to find out the functions installed in that image processing apparatus. That makes it difficult to provide system support to the image processing system.

Particularly, consider a case when an error occurs in one of the image processing apparatuses in an image processing system and error analysis is performed from another image processing apparatus arranged at a remote location in the same image processing system. In that case, first, the processing environment of the image processing apparatus in which the error has occurred needs to be duplicated in the image processing apparatus arranged at a remote location. If all the image processing apparatuses in an image processing systems are installed with identical functions, then duplicating the processing environment does not pose any problem. However, when each image processing apparatus is installed with different functions, as is the case with recent image processing apparatuses equipped with a plug-in mechanism, then it can be difficult to sufficiently duplicate the processing environment. As a result, it becomes difficult to provide system support to the image processing system.

SUMMARY OF THE INVENTION

It is an object of the present invention to at least partially solve the problems in the conventional technology.

According to one aspect of the present invention, there is provided an image processing system including a plurality of image processing apparatuses each including a module storing unit that stores therein a function module registered in the image processing apparatus and a backup unit that backs up the function module stored in the module storing unit and restores a function module based on backup data of the function module; and an external storage device that is connectable to the image processing apparatuses and that stores therein the backup data of the function module. When an error occurs in a first image processing apparatus from among the image processing apparatuses, the backup unit of a second image processing apparatus from among the image processing apparatuses restores the function module corresponding to the first image processing apparatus based on the backup data of the function module stored in the external storage device such that a processing environment of the first image processing apparatus is duplicated in the second image processing apparatus.

Furthermore, according to another aspect of the present invention, there is provided an image processing system including a plurality of image processing apparatuses each including a module storing unit that stores therein a function module registered in the image processing apparatus, a module detecting unit that detects module information of the function module stored in the module storing unit and specifies an other image processing apparatus to instruct the other image processing apparatus to detect module information of a function module stored in the module storing unit of the other image processing apparatus, and a module installing unit that installs a function module that is restored based on the module information detected by the module detecting unit in the module storing unit; and a module storing device that is connectable to the image processing apparatuses and stores therein a file of a function module installable in each of the image processing apparatuses and module information corresponding to the function module. When an error occurs in a first image processing apparatus from among the image processing apparatuses, if the module detecting unit of a second image processing apparatus from among the image processing apparatuses specifies the first image processing apparatus, the module detecting unit of the second image processing apparatus instructs the module detecting unit of the first image processing apparatus to detect the module information of the function module stored in the module storing unit of the first image processing apparatus, and the module installing unit of the second image processing apparatus installs a function module that-is restored from the module storing device based on the module information detected by the module detecting unit of the first image processing apparatus in the module storing unit.

Moreover, according to still another aspect of the present invention, there is provided a method of backing up a function module in a plurality of image processing apparatuses. The method includes storing a function module installed in each of the image processing apparatuses; backing up the function module stored at the storing in an external storage device connected to the image processing apparatuses; and restoring, when an error occurs in a first image processing apparatus from among the image processing apparatuses, the function module corresponding to the first image processing apparatus based on the backup data of the function module stored in the external storage device such that a processing environment of the first image processing apparatus is duplicated in a second image processing apparatus from among the image processing apparatuses.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram for explaining an exemplary configuration of an image processing system according to a first embodiment of the present invention;

FIG. 2 is a diagram of exemplary backup data stored in an external storage device shown in FIG. 1;

FIG. 5 is a block diagram for explaining an exemplary configuration of an image processing system according to a third embodiment of the present invention;

FIG. 6 is a block diagram for explaining an exemplary configuration of an image processing system according to a fourth embodiment of the present invention;

FIG. 9 is a block diagram for explaining an exemplary configuration of an image processing system according to a fifth embodiment of the present invention;

FIG. 10 is a diagram of exemplary backup data stored in an external storage device shown in FIG. 9;

FIG. 11 is a flowchart for explaining operations in the image processing system according to the fifth embodiment;

FIG. 12 is a block diagram for explaining an exemplary configuration of an image processing system according to a sixth embodiment of the present invention;

DETAILED DESCRIPTION OF THE PREFERRED EMBODIMENTS

Figure 3:
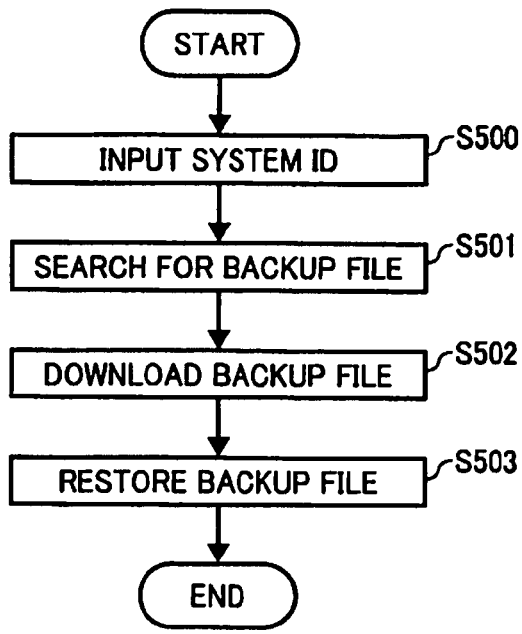
FIG. 3 is a flowchart for explaining operations in the image processing system according to the first embodiment.

Exemplary embodiments of the present invention are described in detail below with reference to the accompanying drawings. The present invention is not limited to these exemplary embodiments.

FIG. 1 is a block diagram for explaining an exemplary configuration of an image processing system according to a first embodiment of the present invention. The image processing system according to the first embodiment includes image processing apparatuses 10 and 30, and an external storage device 20 interconnected via a communication line 40.

Each of the image processing apparatuses 10 and 30 is a multifunction product (MFP) that performs image processing such as scanning, printing, and facsimileing. For example, the MFP scans an original to obtain image data and prints the image data on a recording medium.

The external storage device 20 can be a general-purpose database unit used to store backup data of function modules executed in the image processing apparatuses 10 and 30. In the first embodiment, an external personal computer (PC) is used as the external storage device 20. Instead, it is also possible to use any other storage medium such as a secure digital (SD) card.

The image processing apparatus 10 includes a module storing unit 11 and a backup unit 12. The module storing unit 11 is used to store function modules that are executable in the image processing apparatus 10. The backup unit 12 has two functions. The first function is to create backup of the function modules from the module storing unit 11 in the external storage device 20. The second function is to restore function modules corresponding to another image processing apparatus in the image processing apparatus 10 by using the backup data stored in the external storage device 20. The image processing-apparatus 30 has an identical configuration to that of the image processing apparatus 10, and includes a module storing unit 31 and a backup unit 32.

Meanwhile, instead of simultaneously interconnecting the image processing apparatus 10, the image processing apparatus 30, and the external storage device 20 via the communication line 40 of, e.g., Internet, it is also possible to connect either one of the image processing apparatuses 10 and 30 at a time directly to the external storage device 20. For example, first, the image processing apparatus 10 is connected to the external storage device 20 for creating backup of the data in the image processing apparatus 10. At that time, the image processing apparatus 30 is not connected. Then, the external storage device 20 is disconnected from the image processing apparatus 10 and moved to the remote location at which the image processing apparatus 30 is arranged. Lastly, the image processing apparatus 30 is connected to the external storage device 20 for further processing.

At the start of using the image processing system according to the first embodiment, the backup unit 12 (backup unit 32) can be used to create backup of at least the function modules from the module storing unit 11 (module storing unit 31) in the external storage device 20. For example, if the module storing unit 11 (module storing unit 31) is a hard disk drive (HDD), then it is possible to create backup of the entire HDD in a batch or create backup only of the function modules from the HDD.

In the image processing system, the backup of function modules can be created as soon as one or more function modules are installed in or uninstalled from an image processing apparatus. Moreover, consider a case when, after completion of an image processing job, one or more function modules are installed in or uninstalled from an image processing apparatus. In that case, it is desirable to repeat the process of creating backup of function modules such that the backup data always indicates the latest processing environment in the image processing apparatus.

FIG. 2 is a diagram of exemplary backup data stored in the external storage device 20. In the backup data shown in FIG. 2, system IDs used to identify image processing apparatuses and backup files including backup information are stored in a corresponding manner. As a result, it is possible to know which backup file includes backup information of which image processing apparatus. The system IDs can be serial numbers or internet protocol (IP) addresses of image processing apparatuses connected to the communication line 40.

FIG. 3 is a flowchart for explaining operations in the image processing system according to the first embodiment. The operations shown in FIG. 3 are performed on the assumption that an error occurs in the image processing apparatus 10 and it is necessary to duplicate the processing environment of the image processing apparatus 10 in the image processing apparatus 30 arranged at a remote location. First, when an operator inputs the system ID of the image processing apparatus 10 in which an error has occurred, the backup unit 32 in the image processing apparatus 30 instructs the external storage device 20 to search for the backup file corresponding to the input system ID (Step S500).

Then, the external storage device 20 searches for the backup file corresponding to the system ID of the image processing apparatus 10 (Step S501). The backup unit 32 downloads that backup file (Step S502) and restores it in the module storing unit 31 (Step S503).

In this way, according to the first embodiment, even if an error occurs in any one of image processing apparatuses in the image processing system, it is possible to duplicate the processing environment of that image processing apparatus in another image processing apparatus arranged at a remote location in the same image processing system. As a result, error analysis can be performed from a remote location.

Figure 4:
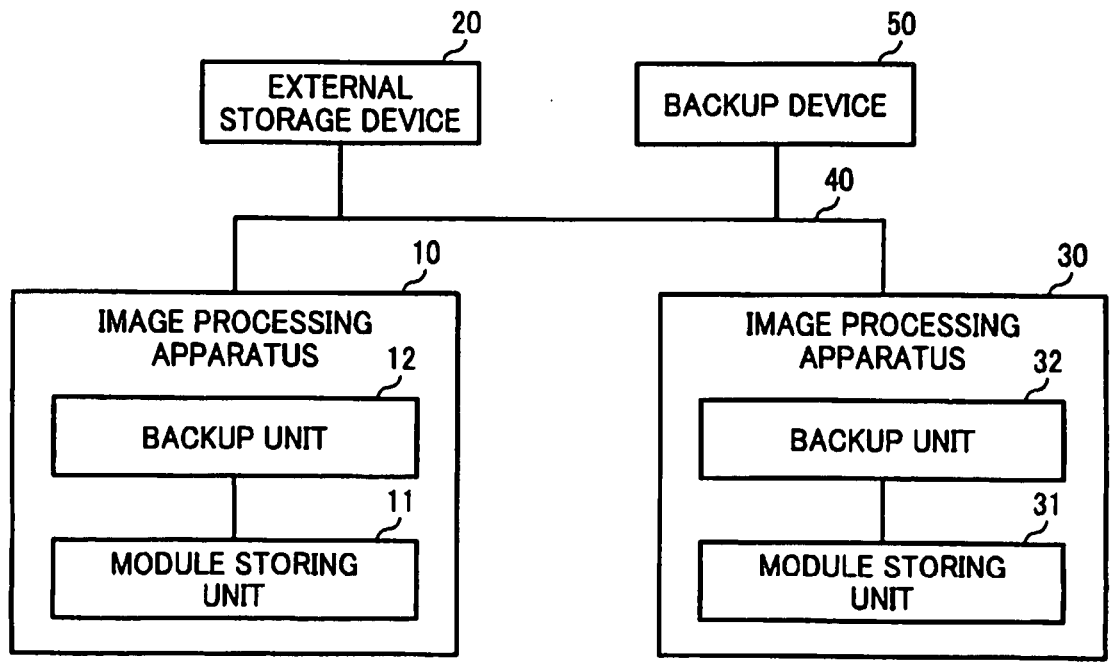
FIG. 4 is a block diagram for explaining an exemplary configuration of an image processing system according to a second embodiment of the present invention.

FIG. 4 is a block diagram for explaining an exemplary configuration of an image processing system according to a second embodiment of the present invention. The configuration of the image processing system according to the second embodiment has a substantially identical configuration to that of the image processing system described in the first embodiment, except that the image processing system according to the second embodiment additionally includes a backup device 50 connected to the communication line 40.

In the first embodiment, the process of duplicating the processing environment of the image processing apparatus 10 in the image processing apparatus 30 is started by using the backup unit 32. However, in the second embodiment, the backup device 50 is arranged separately to perform that process. Thus, if each of the module storing unit 11 and the module storing unit 31 is an HDD, then the backup device 50 can create backup of the entire HDD in a batch or create backup only of the function modules from the HDD.

The backup data obtained by the backup device 50 is identical to the backup data shown in FIG. 2. That is, in the backup data, system IDs used to identify image processing apparatuses and backup files including backup information are stored in a corresponding manner. Meanwhile, the operations of the image processing system according to the second embodiment can also be described with reference to the flowchart in FIG. 3. For that, consider a case when an error occurs in the image processing apparatus 10 and it is necessary to duplicate the processing environment of the image processing apparatus 10 in the image processing apparatus 30. In that case, an operator can input the system ID of the image processing apparatus 10 by using the backup device 50 (Step S500).

Then, the external storage device 20 searches for the backup file corresponding to the system ID of the image processing apparatus 10 (Step S501). The backup device 50 downloads that backup file (Step S502) and restores it in the module storing unit 31 of the image processing apparatus 30 (Step S503).

In this way, according to the second embodiment, even if an error occurs in an image processing apparatus in the image processing system, the backup device 50 can be used to duplicate the processing environment of that image processing apparatus in another image processing apparatus arranged at a remote location in the same image processing system. As a result, error analysis can be performed from a remote location.

FIG. 5 is a block diagram for explaining an exemplary configuration of an image processing system according to a third embodiment of the present invention. In the third embodiment, the above mentioned image processing apparatuses 10 and 30 are replaced by image processing apparatuses 101 and 301, respectively. The image processing apparatus 101 includes the module storing unit 11 and a difference backup unit 13, while the image processing apparatus 301 includes the module storing unit 31 and a difference backup unit 33. Moreover, the external storage device 20 is connected to the image processing apparatuses 101 and 301 via the communication line 40.

The difference backup unit 13 creates differential backup of those function modules in the module storing unit 11 that are installed as an addition to standard function modules of the image processing apparatus 101 or those function modules that are uninstalled from among the standard function modules of the image processing apparatus 101. That is, when function modules are installed as an addition to the standard function modules or installed from among the standard function modules, then, instead of creating backup of all the function modules stored in the module storing unit 11, the difference backup unit 13 creates backup of only those function modules that are installed as an addition to the standard function modules or uninstalled from among the standard function modules. When a function module is uninstalled from among the standard function modules, then it is sufficient to store the module ID of the uninstalled function module for future restoration. Meanwhile, the difference backup unit 13 can also restore function modules of another image processing apparatus based on the backup data stored in the external storage device 20.

In the third embodiment, because the image processing apparatus 301 has an identical configuration to that of the image processing apparatus 101, the description is not repeated for simplification.

The external storage device 20 is used to store the backup data created by the difference backup unit 13. In the external storage device 20, it is necessary to make sure that the backup data is correspondingly stored with the image processing apparatus. For that, in the external storage device 20, each backup file and the system ID of the corresponding image processing apparatus is stored in the form of a database table (see FIG. 2).

At the start of using the image processing system according to the third embodiment, the difference backup unit 13 (difference backup unit 33) can be used to create backup of function modules from the module storing unit 11 (module storing unit 31) in the external storage device 20.

The operations of the image processing system can also be described with reference to the flowchart in FIG. 3. For that, consider a case when an error occurs in the image processing apparatus 101 and when it is necessary to duplicate the processing environment of the image processing apparatus 101 in the image processing apparatus 301. In that case, when an operator inputs the system ID of the image processing apparatus 101 in which an error has occurred, the difference backup unit 33 in the image processing apparatus 301 instructs the external storage device 20 to search for the backup file corresponding to the input system ID (Step S500).

Then, the external storage device 20 searches for the backup file (i.e., information about function modules installed as an addition to the standard function modules or uninstalled from among the standard function modules) corresponding to the system ID of the image processing apparatus 10 (Step S501). The difference backup unit 33 downloads that backup file (Step S502) and restores it in the module storing unit 31 (Step S503).

In this way, according to the third embodiment, backup can be created for the function modules installed as an addition to the standard function modules or uninstalled from among the standard function modules. Hence, even if an error occurs in any one of image processing apparatuses in the image processing system, the processing environment of that image processing apparatus can be duplicated by using less volume of data in another image processing apparatus arranged at a remote location in the same image processing system. As a result, it becomes possible to perform error analysis from a remote location.

FIG. 6 is a block diagram for explaining an exemplary configuration of an image processing system according to a fourth embodiment of the present invention. The image processing system according to the fourth embodiment includes image processing apparatuses 102 and 302, and a module storing device 60 interconnected via the communication line 40.

The image processing apparatus 102 includes the module storing unit 11, a module detecting unit 14, and a module installing unit 15. The module storing unit 11 can be an HDD used to store function modules executable in the image processing apparatus 102. The module detecting unit 14 detects module information (e.g., modules IDs) of the function modules stored in the module storing unit 11. The module installing unit 15 uses module IDs detected by a module detecting unit of another image processing apparatus (e.g., an image processing apparatus in which an error has occurred) and installs function modules corresponding to those detected module IDs from the module storing device 60 in the module storing unit 11.

The module storing device 60 can be a general-purpose database unit in which all function modules installed in the image processing system are stored.

The image processing apparatus 302 has an identical configuration to that of the image processing apparatus 102, and includes the module storing unit 31, a module detecting unit 34, and a module installing unit 35. Although it is assumed that the communication line 40 remotely connects the image processing apparatuses 102 and 302 for remote online operations, it is also possible to use the communication line 40 to connect the image processing apparatuses 102 and 302 within a factory/company for offline operations.

Figures 7, 8:
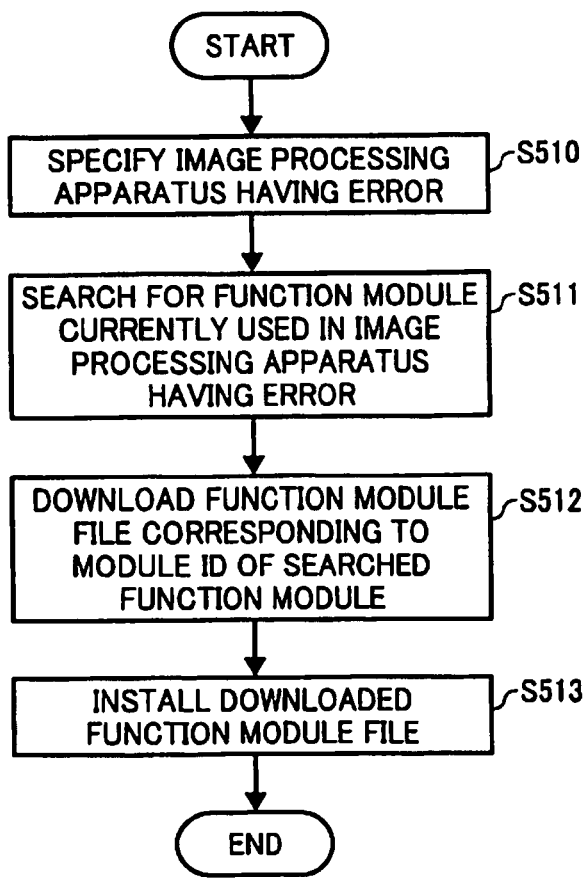
FIG. 7 is a diagram of exemplary backup data stored in a module storing unit shown in FIG. 6.
FIG. 8 is a flowchart for explaining operations in the image processing system according to the fourth embodiment.

FIG. 7 is a diagram of exemplary backup data stored in the module storing device 60. As shown in FIG. 7, the backup data in the module storing device 60 includes module IDs of function modules installed in all image processing apparatuses in the image processing system along with corresponding function module files.

FIG. 8 is a flowchart for explaining operations in the image processing system according to the fourth embodiment. The operations shown in FIG. 8 are performed on the assumption that an error occurs in the image processing apparatus 102 and it is necessary to duplicate the processing environment of the image processing apparatus 102 in the image processing apparatus 302 arranged at a remote location. First, when an operator inputs the system ID of the image processing apparatus 102 in which an error has occurred, the module detecting unit 34 in the image processing apparatus 302 declares that the image processing apparatus 102 has an error (Step S510). The input system ID can be a serial number or an IP address unique to the image processing apparatus 102.

Subsequently, the module detecting unit 14 of the image processing apparatus 102 searches in the module storing unit 11 for modules IDs of the function modules that are currently installed in the image processing apparatus 102 (Step S511).

Then, in the image processing apparatus 302, the module installing unit 35 downloads function module files corresponding to the module IDs searched by the module detecting unit 14 from the module storing device 60 (Step S512) and installs the downloaded function module files in the module storing unit 31 (Step S513). For example, with reference to FIG. 7, if the module detecting unit 14 detects module IDs '12345678' and '12345680', then the module installing unit 35 downloads two function module files, namely, '12345678.jar' and '12345680.jar', respectively, corresponding to the detected module IDs and installs those function module files in the module storing unit 31. As a result, the image processing apparatus 302 can execute the same function modules executed previously by the image processing apparatus 102.

In this way, according to the fourth embodiment, even if an error occurs in any one of image processing apparatuses in the image processing system, it is possible to duplicate the processing environment of that image processing apparatus-in another image processing apparatus arranged at a remote location in the same image processing system. As a result, error analysis can be performed from a remote location. Moreover, unlike in the case of first to third embodiments, there is no need to create backup of the function modules in advance because necessary function modules can be searched and obtained even after an error has occurred.

FIG. 9 is a block diagram for explaining an exemplary configuration of an image processing system according to a fifth embodiment of the present invention. The image processing system according to the fifth embodiment includes image processing apparatuses 103 and 303, and the external storage device 20 interconnected via the communication line 40. The image processing apparatus 103 includes the module storing unit 11, the backup unit 12, and a machine-setting storing unit 16. Similarly, the image processing-apparatus 303 includes the module storing unit 31, the backup unit 32, and a machine-setting storing unit 36.

The machine-setting storing unit 16 (machine-setting storing unit 36) is used to store machine setting information of the image processing apparatus 103 (image processing apparatus 303). Meanwhile, because the machine setting for each image processing apparatus can be set independently, it is not necessary that all image processing apparatuses have an identical machine setting. In such a case, even if function modules installed in one image processing apparatus are reproduced in another image processing apparatus for error analysis, there is a possibility that the processing environment is not duplicated correctly unless the machine setting of the two image processing apparatuses is identical.

The backup unit 12 (backup unit 32) creates backup of the function module information from the module storing unit 11 (module storing unit 31) as well as the machine setting information from the machine-setting storing unit 16 (machine-setting storing unit 36) in the external storage device 20. When an error occurs in another image processing apparatus, then the backup unit 12 (backup unit 32) receives the system ID of the other image processing apparatus input by an operator, downloads backup data (function module information, machine setting information) corresponding to the other image processing apparatus, and stores the downloaded backup data in the module storing unit 11 (module storing unit 31) and the machine-setting storing unit 16 (machine-setting storing unit 36). As a result, the processing environment of the other image processing apparatus is duplicated in the image processing apparatus 103 (image processing apparatus 303).

The external storage device 20 can be a general-purpose database unit used to store backup data (function module information, machine setting information) of all image processing apparatuses in the image processing system.

As described above, the image processing apparatus 303 has an identical configuration to that of the image processing apparatus 103. Although it is assumed that the communication line 40 remotely connects the image processing apparatuses 103 and 303 for remote online operations, it is also possible to use the communication line 40 to connect the image processing apparatuses 103 and 303 within a factory/company for offline operations.

FIG. 10 is a diagram of exemplary backup data stored in the external storage device 20. In the backup data shown in FIG. 10, system IDs used to identify image processing apparatuses, backup files including backup information of function modules, and machine setting files including machine setting information are stored in a corresponding manner in the database of the external storage device 20.

FIG. 11 is a flowchart for explaining operations in the image processing system according to the fifth embodiment. The operations shown in FIG. 11 are performed on the assumption that an error occurs in the image processing apparatus 103 and it is necessary to duplicate the processing environment of the image processing apparatus 103 in the image processing apparatus 303 arranged at a remote location. First, when an operator inputs the system ID of the image processing apparatus 103 in which an error has occurred, the backup unit 32 in the image processing apparatus 303 instructs the external storage device 20 to search for the backup file and the machine setting file corresponding to the input system ID (Step S520). The input system ID can be a serial number or an IP address unique to the image processing apparatus 103.

Then, the external storage device 20 searches for the backup file and the machine setting file corresponding to the system ID of the image processing apparatus 103 (Step S521). The backup unit 32 downloads the backup file and the machine setting file (Step S522), and restores them in the module storing unit 31 and the machine-setting storing unit 36, respectively (Step S523).

In this way, according to the fifth embodiment, even if an error occurs in any one of image processing apparatuses in the image processing system, it is possible to duplicate the processing environment of that image processing apparatus in another image processing apparatus arranged at a remote location in the same image processing system. As a result, error analysis can be performed from a remote location. Moreover, according to the fifth embodiment, the backup data includes the machine setting information in addition to the function module information. By reproducing such backup data in the image processing apparatus arranged at a remote location, it becomes possible to perform more precise error analysis from the remote location.

As described above in the fifth embodiment, the machine setting information is obtained from the external storage device 20. Instead, it is also possible that the backup unit 32 of the image processing apparatus 303 obtains the machine setting information from the machine-setting storing unit 16 of the image processing apparatus 103.

FIG. 12 is a block diagram for explaining an exemplary configuration of an image processing system according to a sixth embodiment of the present invention. The image processing system according to the sixth embodiment includes image processing apparatuses 104 and 304, and the external storage device 20 interconnected via the communication line 40. The image processing apparatus 104 includes the module storing unit 11, the backup unit 12, and a hardware-option storing unit 17. Similarly, the image processing apparatus 304 includes the module storing unit 31, the backup unit 32, and a hardware-option storing unit 37.

The hardware-option storing unit 17 (hardware-option storing unit 37) is used to store information about hardware options (e.g., a finisher or an extension tray) disposed in the image processing apparatus 104 (image processing apparatus 304). Meanwhile, each image processing apparatus can be equipped with a different set of hardware options. In such a case, even if function modules installed in one image processing apparatus are reproduced in another image processing apparatus for error analysis, there is a possibility that the processing environment is not duplicated correctly unless the hardware options in the two image processing apparatuses are identical.

The backup unit 12 (backup unit 32) creates backup of the function module information from the module storing unit 11 (module storing unit 31) as well as the hardware option information from the hardware-option storing unit 17 (hardware-option storing unit 37) in the external storage device 20. When an error occurs in another image processing apparatus, then the backup unit 12 (backup unit 32) receives the system ID of that image processing apparatus input by an operator, downloads backup data (function module information, machine setting information) corresponding to that image processing apparatus, and installs the downloaded backup data in the module storing unit 11 (module storing unit 31) and the hardware-option storing unit 17 (hardware-option storing unit 37). As a result, the processing environment of the other image processing apparatus is duplicated in the image processing apparatus 104 (image processing apparatus 304).

The external storage device 20 can be a general-purpose database unit used to store backup data (function module information, hardware option information) of all image processing apparatuses in the image processing system.

As described above, the image processing apparatus 304 has an identical configuration to that of the image processing apparatus 104. Although it is assumed that the communication line 40 remotely connects the image processing apparatuses 104 and 304 for remote online operations, it is also possible to use the communication line 40 to connect the image processing apparatuses 104 and 304 within a factory/company for offline operations.

Figures 13, 14:
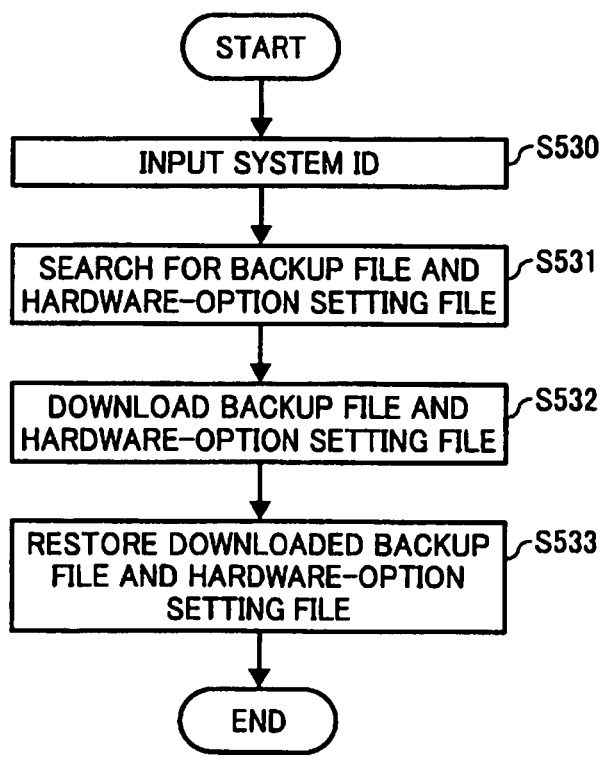
FIG. 13 is a diagram of exemplary backup data stored in an external storage device shown in FIG. 12.
FIG. 14 is a flowchart for explaining operations in the image processing system according to the sixth embodiment.

FIG. 13 is a diagram of exemplary backup data stored in the external storage device 20. In the backup data shown in FIG. 13, system IDs used to identify image processing apparatuses, backup files including backup information of function modules, and hardware-option setting files including hardware option information are stored in a corresponding manner in the database of the external storage device 20.

FIG. 14 is a flowchart for explaining operations in the image processing system according to the sixth embodiment. The operations shown in FIG. 14 are performed on the assumption that an error occurs in the image processing apparatus 104 and it is necessary to duplicate the processing environment of the image processing apparatus 104 in the image processing apparatus 304 arranged at a remote location. First, when an operator inputs the system ID of the image processing apparatus 104 in which an error has occurred, the backup unit 32 in the image processing apparatus 304 instructs the external storage device 20 to search for the backup file and the hardware-option setting file corresponding to the input system ID (Step S530). The input system ID can be a serial number or an IP address unique to the image processing apparatus 104.

Then, the external storage device 20 searches for the backup file and the hardware-option setting file corresponding to the system ID of the image processing apparatus 104 (Step S531). The backup unit 32 downloads that backup file and the hardware-option setting file (Step S532), and restores them in the module storing unit 31 and the hardware-option storing unit 37, respectively (Step S533). Meanwhile, if the difference in the hardware options of the image processing apparatuses 104 and 304 is notified to the operator, then the operator can decide on the hardware options that are necessary for operations in the image processing apparatus 304. By disposing the operator-specified hardware options, the image processing apparatus 304 can execute the same function modules executed previously by the image processing apparatus 104.

In this way, according to the sixth embodiment, even if an error occurs in any one of image processing apparatuses in the image processing system, it is possible to duplicate the processing environment of that image processing apparatus in another image processing apparatus arranged at a remote location in the same image processing system. As a result, error analysis can be performed from a remote location. Moreover, according to the sixth embodiment, the backup data includes the hardware-option setting information in addition to the function module information. By reproducing such backup data in the remote image processing apparatus, it becomes possible to perform more precise error analysis from the remote location.

As described above in the sixth embodiment, the hardware option information is obtained from the external storage device 20. Instead, it is also possible that the backup unit 32 of the image processing apparatus 304 obtains the hardware option information from the hardware-option storing unit 17 of the image processing apparatus 104.

Figures 15, 16:
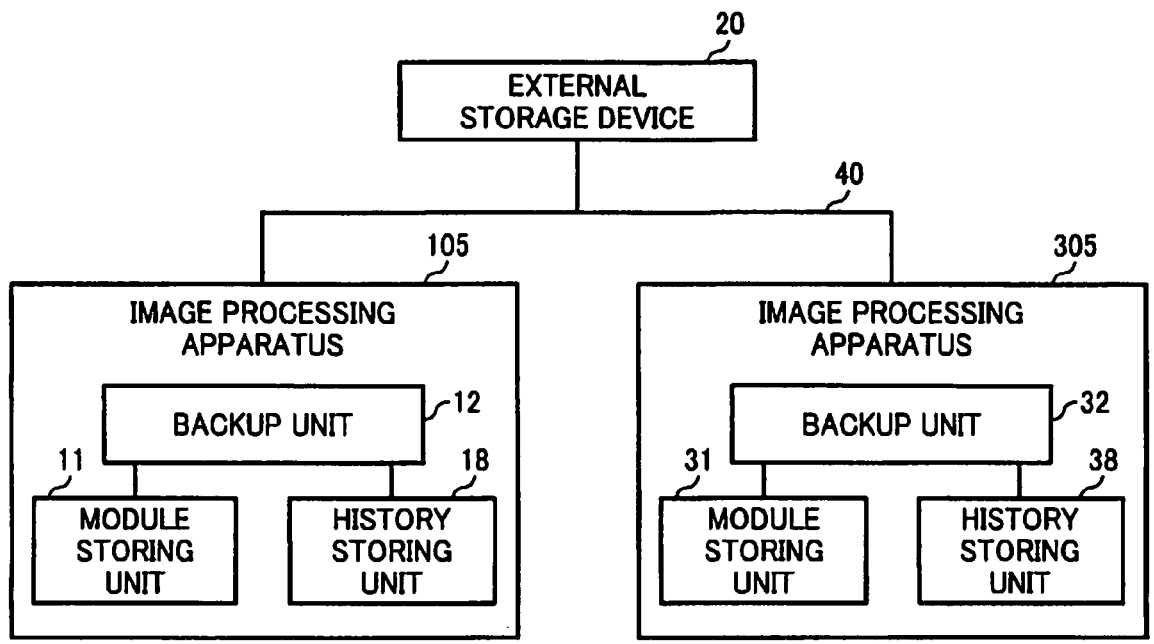
FIG. 15 is a block diagram for explaining an exemplary configuration of an image processing system according to a seventh embodiment of the present invention.
FIG. 16 is a diagram of an exemplary log file stored in a history storing unit shown in FIG. 15.

FIG. 15 is a block diagram for explaining an exemplary configuration of an image processing system according to a seventh embodiment of the present invention. The image processing system according to the seventh embodiment includes image processing apparatuses 105 and 305, and the external storage device 20 interconnected via the communication line 40. The image processing apparatus 105 includes the module storing unit 11, the backup unit 12, and a history storing unit 18. Similarly, the image processing apparatus 305 includes the module storing unit 31, the backup unit 32, and a history storing unit 38.

The history storing unit 18 (history storing unit 38) is used to store information about the history of installation and uninstallation of function modules in the image processing apparatus 105 (image processing apparatus 305). FIG. 16 is a diagram of an exemplary log file stored in the history storing unit 18 (history storing unit 38).

The backup unit 12 (backup unit 32) creates backup of the function module information from the module storing unit 11 (module storing unit 31) as well as the history information from the history storing unit 18 (history storing unit 38) in the external storage device 20. When an error occurs in another image processing apparatus, then the backup unit 12 (backup unit 32) receives the system ID of that image processing apparatus input by an operator, downloads backup data (function module information, history information) corresponding to that image processing apparatus, and installs the downloaded backup data in the module storing unit 11 (module storing unit 31) and the history storing unit 18 (history storing unit 38).

The external storage device 20 can be a general-purpose database unit used to store backup data (function module information, history information) of all image processing apparatuses in the image processing system.

As described above, the image processing apparatus 305 has an identical configuration to that of the image processing apparatus 105. Although it is assumed that the communication line 40 remotely connects the image processing apparatuses 105 and 305 for remote online operations, it is also possible to use the communication line 40 to connect the image processing apparatuses 105 and 305 within a factory/company for offline operations.

Figures 17, 18:
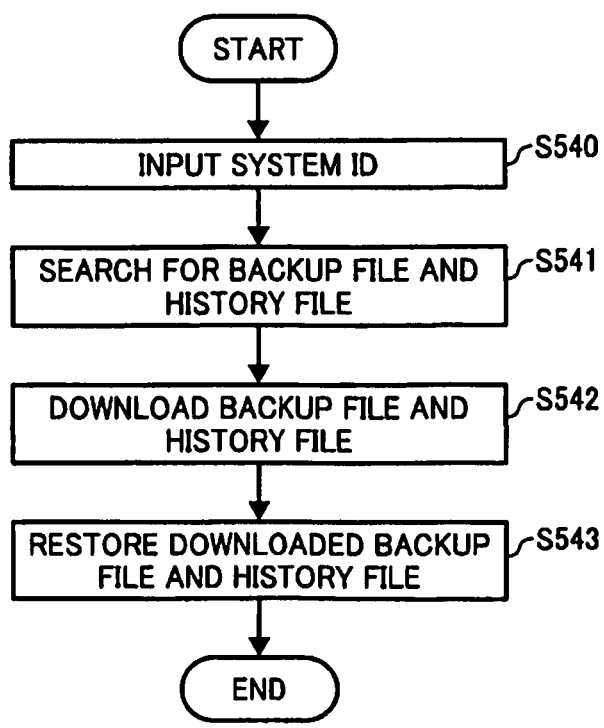
FIG. 17 is a diagram of exemplary backup data stored in an external storage device shown in FIG. 15.
FIG. 18 is a flowchart for explaining operations in the image processing system according to the seventh embodiment.

FIG. 17 is a diagram of exemplary backup data stored in the external storage device 20. In the backup data shown in FIG. 17, system IDs used to identify image processing apparatuses, backup files including backup information of function modules, and history files including information about the history of installation and uninstallation of function modules are stored in a corresponding manner in the database of the external storage device 20.

FIG. 18 is a flowchart for explaining operations in the image processing system according to the seventh embodiment. The operations shown in FIG. 18 are performed on the assumption that an error occurs in the image processing apparatus 105 and it is necessary to duplicate the processing environment of the image processing apparatus 105 in the image processing apparatus 305 arranged at a remote location. First, when an operator inputs the system ID of the image processing apparatus 105 in which an error has occurred, the backup unit 32 in the image processing apparatus 305 instructs the external storage device 20 to search for the backup file and the history file corresponding to the input system ID (Step S540). The input system ID can be a serial number or an IP address unique to the image processing apparatus 105.

Then, the external storage device 20 searches for the backup file and the history file corresponding to the system ID of the image processing apparatus 105 (Step S541). The backup unit 32 downloads that backup file and the history file (Step S542), and restores the function modules in the module storing unit 31 according to the sequence specified in the history file (Step S543). By restoring the function modules in the same sequence as specified in the history file, the image processing apparatus 305 can execute the same function modules executed previously by the image processing apparatus 105.

In this way, according to the seventh embodiment, even if an error occurs in any one of image processing apparatuses in the image processing system, it is possible to duplicate the processing environment of that image processing apparatus in another image processing apparatus arranged at a remote location in the same image processing system. As a result, error analysis can be performed from a remote location.

Moreover, according to the seventh embodiment, the backup data includes the history information in addition to the function module information. By reproducing such backup data in the image processing apparatus arranged at a remote location, it becomes possible to perform more precise error analysis from the remote location.

As described above in the seventh embodiment, the history information is obtained from the external storage device 20. Instead, it is also possible that the backup unit 32 of the image processing apparatus 305 obtains the history information from the history storing unit 18 of the image processing apparatus 105.

Figure 19:
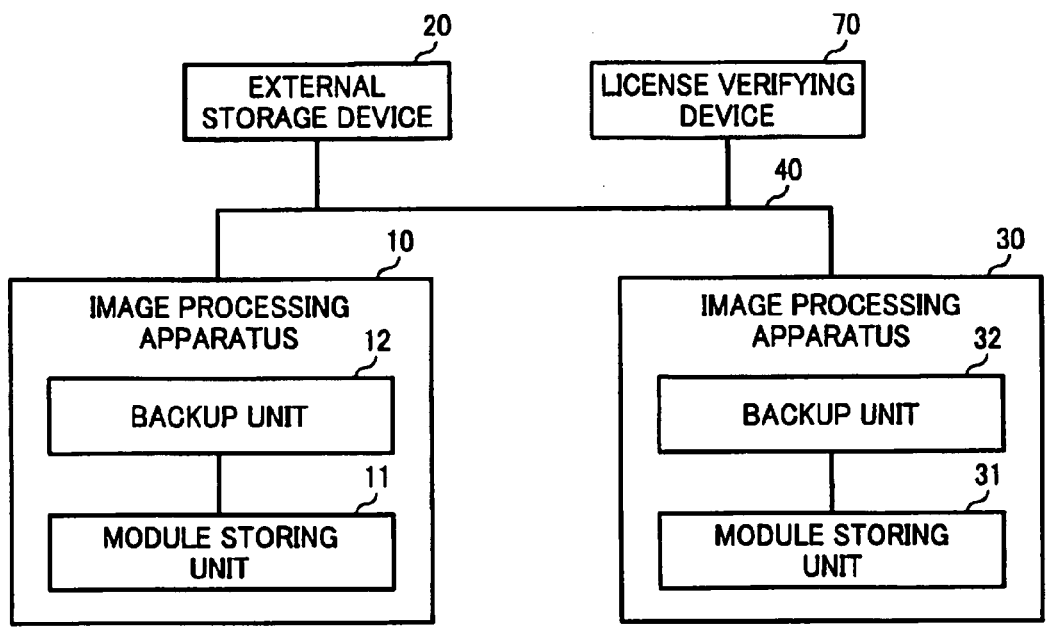
FIG. 19 is a block diagram for explaining an exemplary configuration of an image processing system according to an eighth embodiment of the present invention.

FIG. 19 is a block diagram for explaining an exemplary configuration of an image processing system according to an eighth embodiment of the present invention. The configuration of the image processing system according to the eighth embodiment has a substantially identical configuration to that of the image processing system described in the first embodiment, except that the image processing system according to the eighth embodiment additionally includes a license verifying device 70 connected to the communication line 40.

The license verifying device 70 performs license verification of function modules installed in an image processing apparatus such that the function modules become executable in that image processing apparatus. To perform license verification, a license verification key is necessary corresponding to each function module.

At the start of using the image processing system according to the eighth embodiment, the backup unit 12 (backup unit 32) can be used to create backup of function modules from the module storing unit 11 (module storing unit 31) in the external storage device 20. For example, if the module storing unit 11 (module storing unit 31) is an HDD, then it is possible to create backup of the entire HDD in a batch or create backup only of the function modules from the HDD.

In the backup data stored in the external storage device 20, system IDs used to identify image processing apparatuses and backup files including backup information are stored in a corresponding manner (see FIG. 2).

Figure 20:
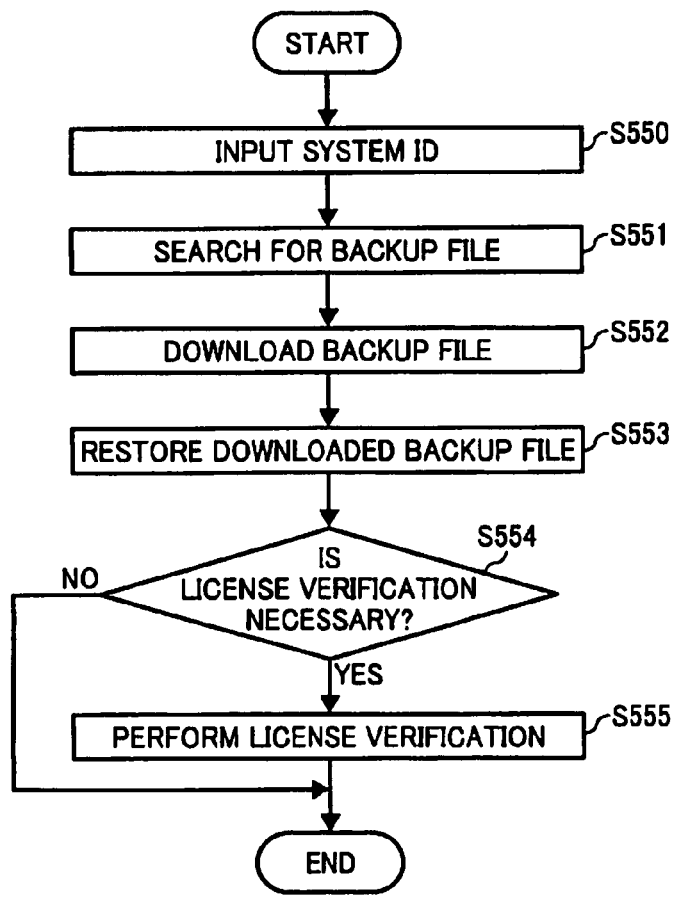
FIG. 20 is a flowchart for explaining operations in the image processing system according to the eighth embodiment.

FIG. 20 is a flowchart for explaining operations in the image processing system according to the eighth embodiment. The operations shown in FIG. 20 are performed on the assumption that an error occurs in the image processing apparatus 10 and it is necessary to duplicate the processing environment of the image processing apparatus 10 in the image processing apparatus 30 arranged at a remote location. First, when an operator inputs the system ID of the image processing apparatus 10 in which an error has occurred, the backup unit 32 in the image processing apparatus 30 instructs the external storage device 20 to search for the backup file corresponding to the input system ID (Step S550). The input system ID can be a serial number or an IP address unique to the image processing apparatus 10.

Then, the external storage device 20 searches for the backup file corresponding to the system ID of the image processing apparatus 10 (Step S551). The backup unit 32 downloads that backup file (Step S552) and restores it in the module storing unit 31 (Step S553).

When a function module executed previously by the image processing apparatus 10 is installed in the image processing apparatus 30, it is necessary to perform license verification of that function module to make it executable in the image processing apparatus 30 (Step S555). However, unlike the image processing apparatus 10, if the image processing apparatus 30 does not possess the license verification key corresponding to the newly installed function module, then license verification cannot be performed and the function module cannot be executed (No at Step S554). In that case, the license verifying device 70 issues a provisional license verification key to the image processing apparatus 30 for performing license verification of the newly installed function module. The provisional license verification key can be configured to have validity for a limited time period. By using the provisional license verification key, the image processing apparatus 30 can execute the newly installed function module executed previously by the image processing apparatus 10.

In this way, according to the eighth embodiment, even if an error occurs in any one of image processing apparatuses in the image processing system, it is possible to duplicate the processing environment of that image processing apparatus in another image processing apparatus arranged at a remote location in the same image processing system. As a result, error analysis can be performed from a remote location. Moreover, according to the eighth embodiment, if it is necessary to perform license verification of a newly installed function module in an image processing apparatus, then the license verifying device 70 can issue a provisional license verification key with which license verification is possible. Thus, even if an error occurs in an image processing apparatus in the image processing system, the function modules in that image processing apparatus can be installed and executed in another image processing apparatus in the same image processing system whereby an identical processing environment is duplicated in the other image processing apparatus.

Figure 21:
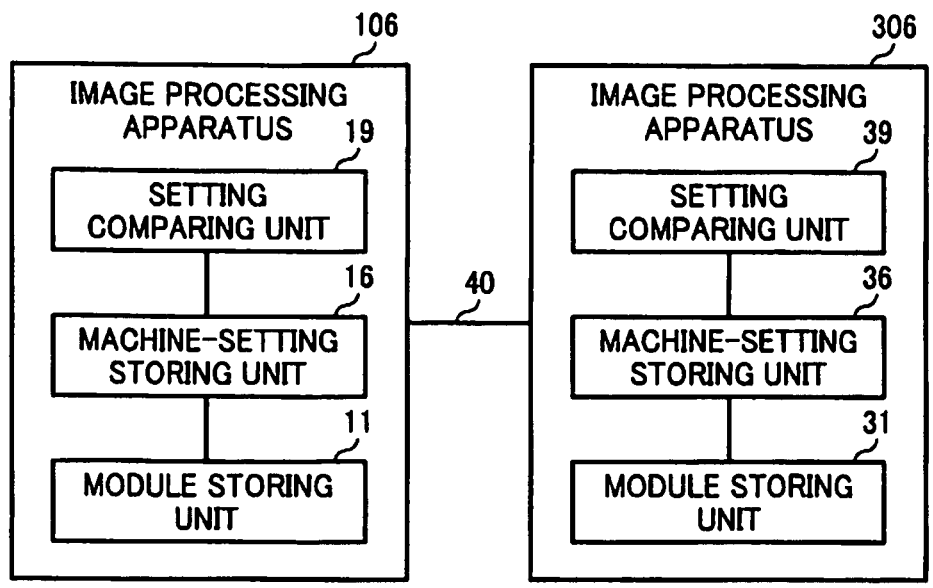
FIG. 21 is a block diagram for explaining an exemplary configuration of an image processing system according to a ninth embodiment of the present invention.

FIG. 21 is a block diagram for explaining an exemplary configuration of an image processing system according to a ninth embodiment of the present invention. In the image processing system according to the ninth embodiment, it is possible to compare function module information or machine setting information of a plurality of image processing apparatuses.

The image processing system according to the ninth embodiment includes image processing apparatuses 106 and 306 connected via the communication line 40. The image processing apparatus 106 includes the module storing unit 11, the machine-setting storing unit 16, and a setting comparing unit 19.

The module storing unit 11 can be an HDD used to store function modules executable in the image processing apparatus 106.

The machine-setting storing unit 16 is used to store machine setting information of the image processing apparatus 106.

The setting comparing unit 19 compares information about setting (e.g., the function module information or the machine setting information) of the image processing apparatus 106 with information about setting of another image processing apparatus.

The image processing apparatus 306 has an identical configuration to that of the image processing apparatus 106, and includes the module storing unit 31, the machine-setting storing unit 36, and a setting comparing unit 39.

Figure 22:
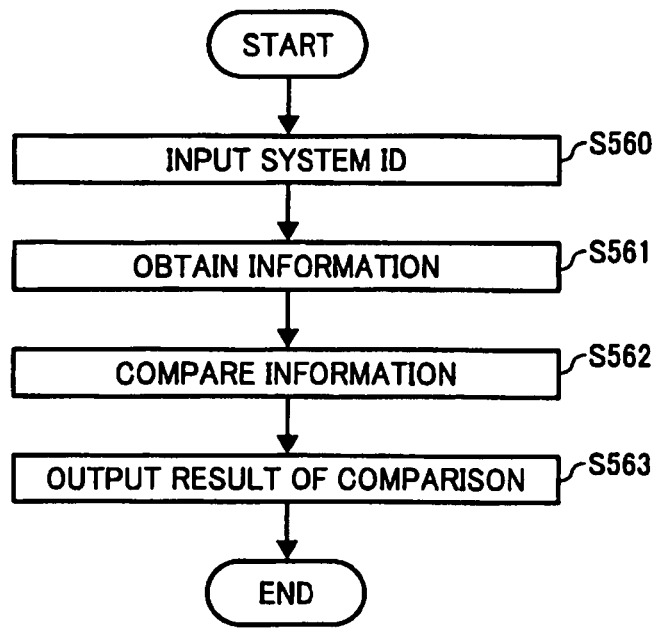
FIG. 22 is a flowchart for explaining operations in the image processing system according to the ninth embodiment.

FIG. 22 is a flowchart for explaining operations in the image processing system according to the ninth embodiment. Herein, it is assumed that the differences in the setting of the image processing apparatuses 106 and 306 are confirmed at the image processing apparatus 306. First, an operator inputs the system ID of the image processing apparatus 106 by using the setting comparing unit 39 of the image processing apparatus 306 (Step S560). The input system ID can be a serial number or an IP address unique to the image processing apparatus 106.

Then, the setting comparing unit 39 obtains the information about setting of the image processing apparatus 106 (i.e., the function module information in the module storing unit 11 and the machine setting information in the machine-setting storing unit 16) as well as the information about setting of the image processing apparatus 306 (i.e., the function module information in the module storing unit 31 and the machine setting information in the machine-setting storing unit 36) (Step S561).

Subsequently, the setting comparing unit 39 compares the information about setting of the image processing apparatuses 106 and 306 (Step S562), and outputs the result of comparison (Step S563). The result of comparison can be displayed on a screen or printed on a recording medium.

Such information regarding the differences in the setting of a plurality of image processing apparatuses can be used in error analysis.

To sum up, according to an aspect of the present invention, it is possible to perform error analysis in a processing environment that is identical to the processing environment in which the error occurred. Moreover, creation of backup of function modules or restoration of backed up function modules can be performed by using a backup unit of an image processing apparatus or a backup device.

Furthermore, it is possible to reduce the volume of backup data.

Moreover, restoration of identical plug-in function modules as well as identical machine setting enables to duplicate a processing environment suitable for error analysis.

Furthermore, restoration of identical plug-in function modules as well as identical hardware options enables to duplicate a processing environment suitable for error analysis from the perspective of software as well as hardware.

Moreover, restoring function modules in the sequence specified in installation history enables to duplicate a processing environment in which there is no disparity due to the difference in installation sequence.

Furthermore, it is possible to restore a function module in an image processing apparatus even if the image processing apparatus does not possess a license verification key corresponding to the function module.

Moreover, because it is not necessary to create backup of function modules in advance, it is possible to save processing time as well as memory space.

Furthermore, it is possible to compare the difference in function modules or machine setting of a plurality of image processing apparatuses without any difficulty.

Moreover, even if an error occurs in an image processing apparatus equipped with a plug-in mechanism for installation and uninstallation of function modules, it is possible to duplicate the processing environment of that image processing apparatus in another image processing apparatus arranged at a remote location without any difficulty. As a result, error analysis can be performed in an identical processing environment duplicated at a remote location.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network system, the network system comprising:
   a plurality of image processing apparatuses, each including,
      a downloading unit configured to receive backup data, and
      a restoring unit configured to implement functions of another one of the plurality of image processing apparatuses based on the backup data; and
   a storage device separated from and external to the plurality of image processing apparatuses and connected to at least one of the plurality of image processing apparatuses via a network, the storage device including,
      a storage unit configured to store therein backups received from at least one of the plurality of image processing apparatuses, each of the backups including backup data for one of the plurality of image processing apparatus and identification information that identifies which one of the plurality of image processing apparatuses the backup data is associated with,
      a receiver configured to receive a search request over the network from one of the plurality of image processing apparatuses, the search request identifying a faulty image processing apparatus of the plurality of image processing apparatuses,
      a processor configured to search the storage unit to find the backup data associated with the faulty image processing apparatus based on the identification information and the received search request, and
      a transmitter configured to transmit, over the network, the backup data for the faulty image processing apparatus to a backup image processing apparatus of the plurality of image processing apparatuses, wherein
   the backup image processing apparatus is configured to utilize the backup data to restore functionality associated with the faulty image processing apparatus, and
   each of the image processing apparatuses includes,
      a requesting unit configured to send the search request to the storage device, the search request instructing the storage device to locate the backup data of the faulty image processing apparatus, and
      a setting comparison unit configured to detect differences in hardware options available via the backup image processing apparatus and the hardware options associated with the faulty image processing based on hardware option information received from the storage unit, the hardware option information indicating the hardware options available via an associated image processing apparatus,
   each of the plurality of image processing apparatuses are configured to transmit the hardware option information to the storage unit,
   the storage unit is configured to store the hardware option information within the backup data and associate the backup data including the hardware option information with the associated image processing apparatus, and
   the backup image processing apparatus includes a notifying unit configured to display a notification of the differences in the hardware options detected by the setting comparison unit, if the setting comparison unit detects that differences exist between the hardware options available via the backup image processing apparatus and the hardware options indicated in the hardware option information associated with the faulty image processing apparatus.

2. The network system of claim 1, wherein each of the backup data stored in the storage unit include includes function module information and history information of an associated one of the plurality of image processing apparatuses, the function module information indicating function modules installed on the respective image processing apparatus and the history information indicating an order of installing and uninstalling the function modules, and the restoring unit is configured to implement the functions indicated by the function module information by installing the functions in the order indicated by the history information.

3. The network system of claim 1, wherein each of the image processing apparatuses includes a transmitting unit configured to transmit the backup data for a respective image processing apparatus of the plurality of image processing apparatuses to the storage device, the backup data including function module information and history information of the respective image processing apparatus, the function module information indicating function modules installed on the respective image processing apparatus and the history information indicating an order of installing and uninstalling the function modules.

4. The network system of claim 1, wherein the storage device is configured to store the hardware option information such that the stored hardware option information indicates whether one or more of a finisher and an extension tray is disposed in an associated image processing apparatus.

5. A method of managing backups for a plurality of image processing apparatuses, the method comprising:

storing, at a storage device, backups received, over a network, from at least one of the plurality of image processing apparatuses that are separate and external from the storage device, each of the backups including backup data for one of the plurality of image processing apparatus and identification information that identifies which one of the plurality of image processing apparatuses the backup data is associated with;

sending the search request to the storage device, the search request instructing the storage device to locate the backup data of a faulty image processing apparatus of the plurality of image processing apparatuses;

receiving a search request over the network from one of the plurality of image processing apparatuses, the search request identifying the faulty image processing apparatus of the plurality of image processing apparatuses;

searching for the backup data associated with the faulty image processing apparatus based on the identification information and the received search request; and transmitting, over the network, the backup data for the faulty image processing apparatus to a backup image processing apparatus of the plurality of image processing apparatuses, wherein the backup image processing apparatus is configured to detect differences in functionality available via the backup image processing apparatus and the functionality associated with the faulty image processing based on hardware option information received from the storage unit, the hardware option information indicating the functions available via an associated image processing apparatus, generate a notification of the detected differences in functionality, if differences are detected between the functionality available via the backup image processing apparatus and the functionality indicated in the hardware option information associated with the faulty image processing apparatus, and utilize the backup data to restore the functionality to the network that was associated with both the faulty image processing apparatus and is also associated with the backup image processing apparatus.

6. The method of claim 5, further comprising:

receiving the backup data at the backup image processing apparatus; and implementing functions of the faulty image processing apparatus on the backup image processing apparatus based on the backup data.

7. The method of claim 5, wherein each of the backup data includes function module information and history information of an associated one of the plurality of image processing apparatuses, the function module information indicating function modules installed on the respective image processing apparatus and the history information indicating an order of installing and uninstalling the function modules, and the implementing implements the functions indicated by the function module information by installing the functions in the order indicated by the history information.

8. The method of claim 5, further comprising:

transmitting the backup data for a respective image processing apparatus of the plurality of image processing apparatuses to the storage device, the backup data including function module information and history information of the respective image processing apparatus, the function module information indicating function modules installed on the respective image processing apparatus and the history information indicating an order of installing and uninstalling the function modules.

9. The method claim 5, wherein the hardware option information, used in detecting the differences in functionality, includes an indication of whether one or more of a finisher and an extension tray is disposed in an associated image processing apparatus.

10. A storage device comprising:

a storage unit configured to store therein backups received from at least one of a plurality of image processing apparatuses, each of the backups including backup data for a respective one of the plurality of image processing apparatus and identification information that identifies the respective one of the plurality of image processing apparatuses that the backup data is associated with;

a receiver configured to receive a search request from one of the plurality of image processing apparatuses, the search request identifying a faulty image processing apparatus of the plurality of image processing apparatuses and instructing the storage device to locate the backup data of the faulty image processing apparatus;

a processor configured to search the storage unit to find the backup associated with the faulty image processing apparatus based on the identification information and the received search request; and a transmitter configured to transmit the backup data for the faulty image processing apparatus to a backup image processing apparatus of the plurality of image processing apparatuses, wherein the backup image processing apparatus is configured to, detect differences in functionality available via the backup image processing apparatus and the functionality associated with the faulty image processing based on hardware option information received from the storage unit, the hardware option information indicating the functions available via an associated image processing apparatus, generate a notification of the detected differences in functionality, if differences are detected between the functionality available via the backup image processing apparatus and the functionality indicated in the hardware option information associated with the faulty image processing apparatus, and utilize the backup data to restore the functionality to the network that was associated with the faulty image processing apparatus and is also associated with the backup image processing apparatus.

11. The storage device of claim 10, wherein the storage device is configured to store the hardware option information such that the stored hardware option information indicates whether one or more of a finisher and an extension tray is disposed in an associated image processing apparatus.

\* \* \* \* \*